(12) United States Patent
    Curington

(10) Patent No.: US 9,033,054 B2
(45) Date of Patent: May 19, 2015

(54) METAL TO METAL SEAL FOR DOWNHOLE TOOLS

(75) Inventor: Alfred R. Curington, The Woodlands, TX (US)

(73) Assignee: WellDynamics, Inc., Spring, TX (US)

( * ) Notice: Subject to any disclaimer, the term of this patent is extended or adjusted under 35 U.S.C. 154(b) by 50 days.

(21) Appl. No.: 12/374,499

(22) PCT Filed: Aug. 3, 2006

(86) PCT No.: PCT/US2006/030373
§ 371 (c)(1),
(2), (4) Date: Feb. 24, 2009

(87) PCT Pub. No.: WO2008/016358
PCT Pub. Date: Feb. 7, 2008

(65) Prior Publication Data
US 2009/0277642 A1    Nov. 12, 2009

(51) Int. Cl.
*F16J 15/12*  (2006.01)
*E21B 34/06*  (2006.01)
*F16J 15/08*  (2006.01)
*E21B 34/00*  (2006.01)

(52) U.S. Cl.
CPC .............. *F16J 15/121* (2013.01); *E21B 34/06* (2013.01); *E21B 2034/007* (2013.01); *F16J 15/0887* (2013.01)

(58) Field of Classification Search
CPC ............. E21B 2033/005; F16J 15/3236; F16J 15/0887
USPC ..................... 166/373, 88.4, 86.1, 84.1, 85.3; 277/312, 336, 530, 566, 647, 314, 335, 277/339; 251/173
See application file for complete search history.

(56) References Cited

U.S. PATENT DOCUMENTS 2,075,947 A * 4/1937 Kennedy ................. 277/626
2,284,340 A * 5/1942 Nuckles ................... 277/438
(Continued)

FOREIGN PATENT DOCUMENTS

DE    2055467 A1    5/1972
EP    0553997 A2    8/1993

OTHER PUBLICATIONS

International Search Report and Written Opinion issued Sep. 9, 2008, for International Patent Application Serial No. PCT/US07/60648, 6 pages.
(Continued)

*Primary Examiner* — Shane Bomar
*Assistant Examiner* — Kipp Wallace
(74) *Attorney, Agent, or Firm* — Smith IP Services, P.C.

(57) ABSTRACT

A metal to metal seal for downhole tools. A sealing device includes a metal seal. A nonmetal seal may be used to bias the metal seal in a radial direction in response to a pressure differential applied to the sealing device. A well tool includes a housing assembly, a closure member and the sealing device. Both of the metal and nonmetal seals contact a selected one of the housing assembly and closure member when the closure member blocks flow through the housing assembly. A method of sealing between the housing assembly and closure member includes the step of displacing the closure member to relieve the pressure differential, the metal seal continuing to seal against the pressure differential until the nonmetal seal no longer seals between the housing assembly and the closure member.

21 Claims, 4 Drawing Sheets

(56) References Cited

U.S. PATENT DOCUMENTS

| | | |
|---|---|---|
| 2,733,969 A | 2/1956 | Polk |
| 2,841,429 A | 7/1958 | McCuistion |
| 2,927,830 A | 3/1960 | Workman |
| 3,047,300 A * | 7/1962 | Taylor et al. ............... 277/530 |
| 3,284,089 A | 11/1966 | Wrenshall |
| 3,297,344 A * | 1/1967 | Hanes ..................... 285/123.9 |
| 3,572,735 A | 3/1971 | Dryer |
| 3,642,248 A | 2/1972 | Benware |
| 3,797,864 A | 3/1974 | Hynes et al. |
| 3,820,830 A | 6/1974 | Dryer |
| 3,907,307 A * | 9/1975 | Maurer et al. ............. 277/513 |
| 4,113,268 A | 9/1978 | Simmons et al. |
| 4,131,287 A * | 12/1978 | Gunderson et al. ......... 277/328 |
| 4,133,542 A | 1/1979 | Janian et al. |
| 4,162,782 A * | 7/1979 | Wilkins ..................... 251/173 |
| 4,178,020 A | 12/1979 | Dopyera |
| 4,293,116 A * | 10/1981 | Hinrichs .................... 251/173 |
| 4,478,423 A | 10/1984 | Hjelsand et al. |
| 4,540,053 A | 9/1985 | Baugh et al. |
| 4,585,238 A | 4/1986 | Nicholson |
| 4,588,030 A * | 5/1986 | Blizzard .................... 166/120 |
| 4,592,284 A | 6/1986 | Fukuda |
| 4,618,154 A * | 10/1986 | Freudenthal ............... 277/556 |
| 4,719,971 A * | 1/1988 | Owens ....................... 166/191 |
| 4,749,043 A | 6/1988 | Rodenberger |
| 4,787,642 A | 11/1988 | Etheridge |
| 5,095,994 A | 3/1992 | Dollison |
| 5,199,718 A | 4/1993 | Niemiec |
| 5,246,236 A * | 9/1993 | Szarka et al. .............. 277/337 |
| 5,306,021 A | 4/1994 | Morvant |
| 5,316,084 A | 5/1994 | Murray et al. |
| 5,433,456 A | 7/1995 | Nicholson |
| 5,464,042 A | 11/1995 | Haunhorst |
| 5,529,284 A | 6/1996 | Berger et al. |
| 5,551,703 A | 9/1996 | Morvant |
| 5,755,428 A | 5/1998 | Ollivier |
| 5,799,953 A | 9/1998 | Henderson |
| 5,887,876 A | 3/1999 | Aldridge et al. |
| 5,979,904 A | 11/1999 | Balsells |
| 5,997,003 A | 12/1999 | Turner |
| 6,086,069 A * | 7/2000 | Bedford ..................... 277/380 |
| 6,161,838 A | 12/2000 | Balsells |
| 6,267,383 B1 | 7/2001 | Morvant |
| 6,302,402 B1 * | 10/2001 | Rynders et al. ............ 277/530 |
| 6,485,002 B1 | 11/2002 | Goss |
| 6,494,465 B1 | 12/2002 | Bucknell |
| 6,598,883 B1 | 7/2003 | Hammi et al. |
| 6,705,615 B2 * | 3/2004 | Milberger et al. ......... 277/328 |
| 6,869,079 B2 | 3/2005 | Zheng |
| 6,908,114 B2 | 6/2005 | Moner |
| 7,559,366 B2 | 7/2009 | Hunter et al. |
| 2002/0140184 A1 | 10/2002 | Janoff et al. |
| 2003/0000693 A1 * | 1/2003 | Couren et al. ................. 166/66 |
| 2005/0139362 A1 * | 6/2005 | Coon et al. .................. 166/386 |
| 2008/0169610 A1 * | 7/2008 | Curington ................... 277/312 |
| 2010/0052267 A1 | 3/2010 | Castleman et al. |

OTHER PUBLICATIONS

International Search Report issued Dec. 11, 2006, for International Patent Application Serial No. PCT/US06/30373, 2 pages.

U.S. Appl. No. 12/363,034, filed Jan. 30, 2009, 29 pages.

PerkinElmer, Energy Technologies Product Brochure, undated, 2 pages.

PerkinElmer, Resilient Metal Seals Product Brochure, 2008, 2 pages.

PerkinElmer, PressureScience™ Product Brochure, undated, 6 pages.

PerkinElmer, Centurion™ Mechanical Seals Product Brochure, undated 16 pages.

International Preliminary Report on Patentability issued Feb. 12, 2009, for International Patent Application Serial No. PCT/US06/30373, 5 pages.

Examiner's first report issued May 12, 2010, for Australian Patent Application Serial No. 2006346788, 2 pages.

International Preliminary Report on Patentability issued Aug. 19, 2010, for International Patent Application No. PCT/US08/052936, 6 pages.

Office Action issued May 24, 2011 for Canadian Patent Application No. 2659010, 2 pages.

Office Action issued Mar. 28, 2011 for U.S. Appl. No. 12/363,034, 26 pages.

Office Action issued Aug. 8, 2011 for U.S. Appl. No. 12/363,034, 15 pages.

Office Action issued Feb. 25, 2014 for U.S. Appl. No. 12/363,034, 21 pages.

Office Action issued Jun. 6, 2013 for U.S. Appl. No. 12/363,034, 21 pages.

European Search Report issued May 9, 2012 for EP Patent Application No. 06813289.3, 6 pages.

Office Action issued Sep. 6, 2012 for U.S. Appl. No. 12/363,034, 20 pages.

Advisory Action issued Jan. 15, 2014 for U.S. Appl. No. 12/363,034, 3 pages.

European Examination Report issued Oct. 2, 2013 for European Patent Application No. 06813289.3, 4 pages.

Office Action issued Oct. 17, 2013 for U.S. Appl. No. 12/363,034, 25 pages.

* cited by examiner

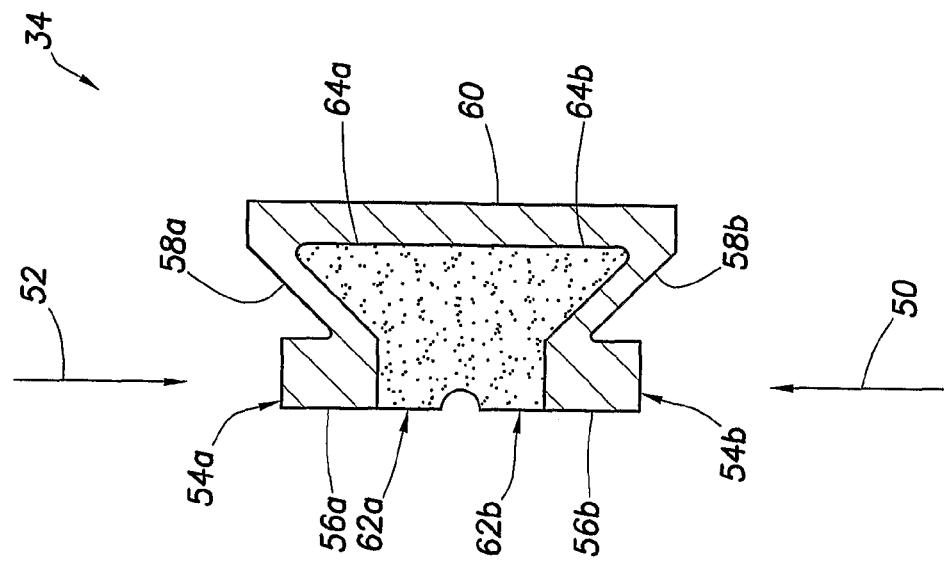
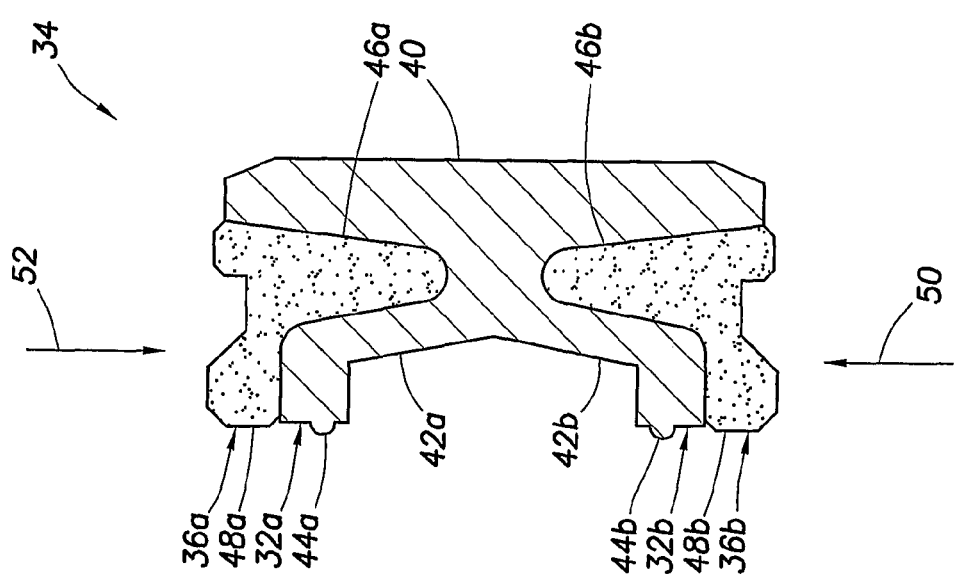

METAL TO METAL SEAL FOR DOWNHOLE TOOLS

CROSS-REFERENCE TO RELATED APPLICATION

This application is a national stage application under 35 USC §371 of International Application No. PCT/US06/30373 filed on Aug. 3, 2006. The entire disclosure of this prior application is incorporated herein by this reference.

TECHNICAL FIELD

The present invention relates generally to equipment utilized and operations performed in conjunction with a subterranean well and, in an embodiment described herein, more particularly provides a metal seal for downhole tools.

BACKGROUND

Metal seals are sometimes used to seal between structures in well tools, and in equipment used in other environments. However, several problems are frequently encountered when metal seals are used. For example, metal seals require very smooth and clean surfaces to seal against, and most metals can only be elastically deformed to a limited extent (which thereby limits the biasing force available from elastically deforming a metal seal), etc.

Elastomeric and other types of nonmetal seals may provide the ability to seal against irregular and unclean surfaces, and may provide sufficient resilient biasing force for urging the seals against the surfaces. However, nonmetal seals tend to degrade rapidly when used in dynamic configurations, i.e., where the seal must contact a moving surface while sealing against a pressure differential, or where the seal loses contact with the surface while the pressure differential still exists across the seal.

Therefore, it may be seen that improvements are needed in the art of sealing devices.

SUMMARY

In carrying out the principles of the present invention, a sealing device is provided which solves at least one problem in the art. One example is described below in which the sealing device includes both a metal seal and an elastomer seal. Another example is described below in which elastomer seals are used to energize metal seals in response to pressure differentials in different directions.

In one aspect of the invention, a sealing device is provided. The sealing device includes at least one metal seal. A nonmetal seal may be used to bias the metal seal in a radial direction in response to a pressure differential applied to the sealing device.

In another aspect of the invention, a well tool is provided which includes a housing assembly and a closure member. A sealing device is used for sealing between the housing assembly and closure member. The sealing device includes at least one metal seal and at least one nonmetal seal. Both of the metal and nonmetal seals contact one of the housing assembly and closure member when the closure member blocks flow through the housing assembly.

A method of sealing between a housing assembly and a closure member is also provided by the invention. The method includes the steps of: providing a sealing device including at least one metal seal and at least one nonmetal seal; applying a pressure differential across the sealing device while the sealing device seals between the housing assembly and the closure member; and displacing the closure member to relieve the pressure differential. The metal seal continues to seal against the pressure differential until the nonmetal seal no longer seals between the housing assembly and the closure member.

These and other features, advantages, benefits and objects of the present invention will become apparent to one of ordinary skill in the art upon careful consideration of the detailed description of representative embodiments of the invention hereinbelow and the accompanying drawings, in which similar elements are indicated in the various figures using the same reference numbers.

BRIEF DESCRIPTION OF THE DRAWINGS

FIG. 3 is a further enlarged scale cross-sectional view of a sealing device for use in the closure mechanism;

FIG. 5 is a further enlarged scale cross-sectional view of an alternate configuration of the sealing device for use in the closure mechanism of FIG. 4.

DETAILED DESCRIPTION

It is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
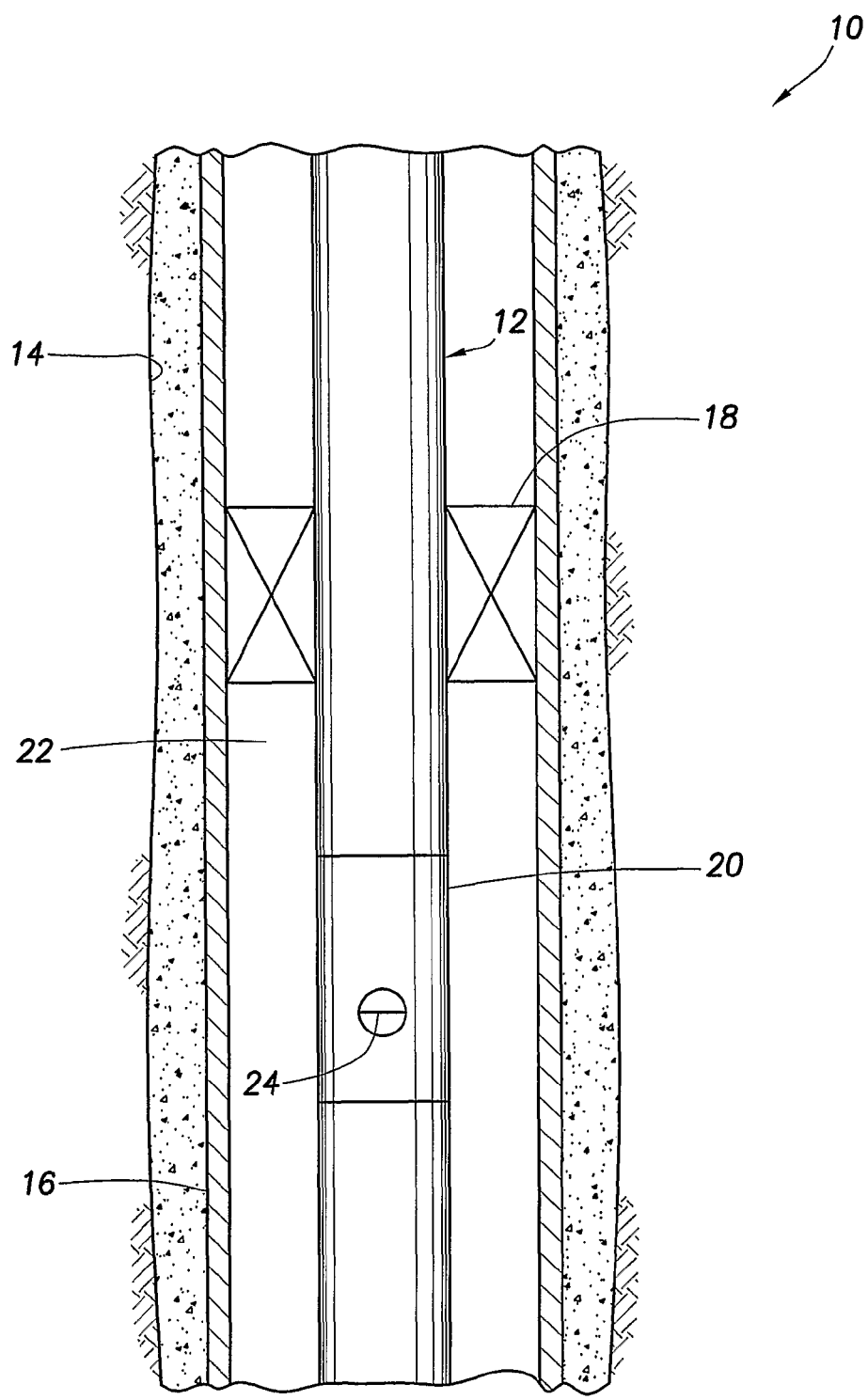
FIG. 1 is a schematic partially cross-sectional view of a well system embodying principles of the present invention.

Representatively illustrated in FIG. 1 is a well system 10 which embodies principles of the present invention. In the well system 10, a tubular string 12 (such as a production tubing string) is positioned in a wellbore 14 lined with casing 16. The tubular string 12 includes well tools 18, 20.

The well tool 18 is a packer, and the well tool 20 is a flow control device (such as a valve or choke). The packer provides an annular seal between the tubular string 12 and the casing 16, and the flow control device regulates fluid communication between the interior of the tubular string and an annulus 22 formed between the tubular string and the casing. The flow control device includes a closure mechanism 24 which is operated to regulate flow.

At this point, it should be reiterated that the invention is not limited to any of the details of the well system 10 described herein. For example, it is not necessary for the invention to be used in a wellbore, in a well tool, in a cased wellbore, in a flow control device, in a tubular string, etc. The closure mechanism 24 could, as another example, be used in a hydraulic setting device of the packer 18, or could be used in another type of well tool. Thus, it should be clearly understood that the well system 10 is only a single example of a wide variety of uses for the principles of the invention.

Figure 2:
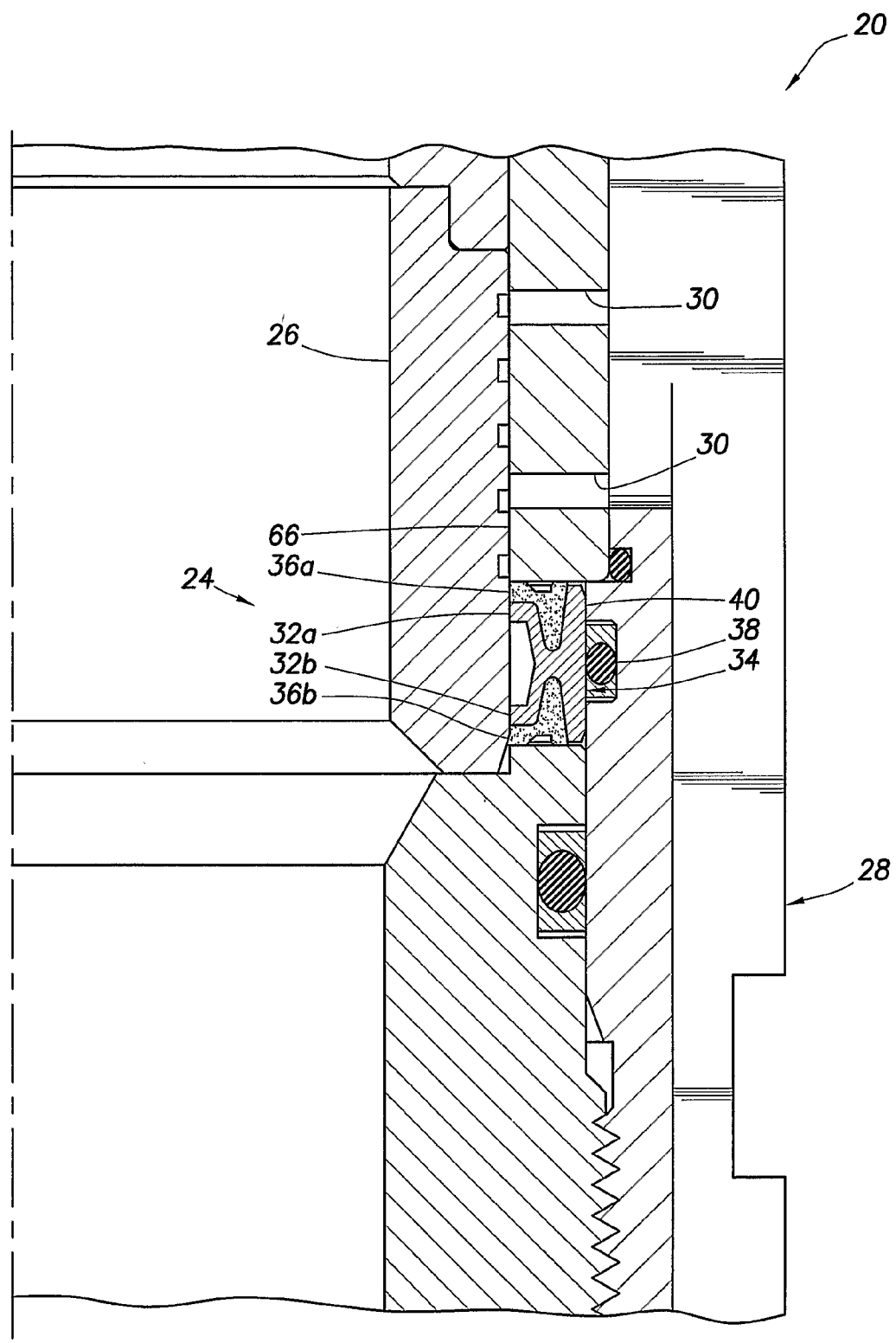
FIG. 2 is an enlarged scale cross-sectional view of a closure mechanism of a flow control device in the well system.

Referring additionally now to FIG. 2, an enlarged scale cross-sectional view of a portion of the well tool 20 is representatively illustrated. In this view it may be seen that the closure mechanism 24 includes a tubular closure member 26 which is displaced relative to a housing assembly 28 to thereby regulate flow through openings 30 in the housing assembly.

To completely block flow through the openings 30, the closure member 26 engages a sealing device 34. The sealing device 34 operates to provide a seal between the closure member 26 and the housing assembly 28 to thereby prevent flow through the openings 30.

In one important feature of the sealing device 34, both metal seals 32a, 32b and nonmetal seals 36a, 36b are included in the device. These seals 32a, 32b, 36a, 36b contact and seal against the closure member 26 when the closure member is in the position depicted in FIG. 2. However, it will be appreciated that the sealing device 34 could be carried on, and displace with, the closure member 26, so that the seals 32a, 32b, 36a, 36b could contact and seal against the housing assembly 28 when the closure member is in the position depicted in FIG. 2, if desired.

Note that a separate seal 38 is shown sealing between the sealing device 34 and the housing assembly 28. However, it will be appreciated that this seal 38 could be incorporated into the sealing device 34, if desired. For example, the nonmetal seals 36a, 36b could extend further radially outward into sealing contact with the housing assembly 28, and/or a seal could be formed by metal to metal contact between the housing assembly and an outer ring 40 of the device 34.

Referring additionally now to FIG. 3, a further enlarged cross-sectional view of the sealing device 34 is representatively illustrated. In this view it may be more clearly seen that the metal seals 32a, 32b each include an inclined beam or arm 42a, 42b extending between a seal surface 44a, 44b and the ring 40. It may also be seen that each of the nonmetal seals 36a, 36b includes a generally wedge-shaped portion 46a, 46b positioned between the ring 40 and a respective one of the arms 42a, 42b.

The metal seals 32a, 32b are preferably made of strong, durable and resilient metals, such as Inconel 718, 13-chrome steel, etc. The nonmetal seals 36a, 36b are preferably made of high temperature and well fluid resistant, strong and elastomeric materials, such as NBR, HNBR, fluoroelastomers, etc. Non-elastomeric materials, such as PEEK, etc., may additionally or alternatively be used in the nonmetal seals 36a, 36b. It should be clearly understood that any metal materials may be used for the metal seals 32a, 32b, and any nonmetal materials may be used for the nonmetal seals 36a, 36b, in keeping with the principles of the invention.

Note that the nonmetal seals 36a, 36b are not necessary for the sealing device 34 to seal between the housing assembly 28 and the closure member 26. The sealing device 34 could be provided without the nonmetal seals 36a, 36b, in which case the metal seals 32a, 32b would still provide sealing engagement with the closure member 26. Use of the nonmetal seals 36a, 36b is preferred when a bubble-tight sealing engagement is required.

When the closure member 26 engages the sealing device 34 as depicted in FIG. 2, the seal surfaces 44a, 44b contact the outer surface of the closure member and the arms 42a, 42b are deflected radially outward somewhat. This deflection causes elastic deformation of the arms 42a, 42b, resulting in a biasing force being applied by the arms to the seal surfaces 44a, 44b. Note that the seal surfaces 44a, 44b have small ridges formed thereon to concentrate this radial biasing force on a relatively small area, thereby increasing the contact pressure between the seal surfaces and the outer surface of the closure member 26. It should be understood, however, that use of the small ridges is not required on the seal surfaces 44a, 44b.

The nonmetal seals 36a, 36b are also radially compressed between the ring 40 and the outer surface of the closure member 26. In this manner, a seal surface 48a, 48b on each nonmetal seal 36a, 36b is biased into sealing contact with the outer surface of the closure member 26.

Deflection of the arms 42a, 42b as described above will compress the wedge portion 46a, 46b of each nonmetal seal between the ring 40 and the respective arm. If the nonmetal seals 36a, 36b are made of a resilient material, this compression will result in a radial biasing force being applied to each arm, thereby further biasing the seal surfaces 44a, 44b into contact with the outer surface of the closure member 26.

When a pressure differential 50 is applied across the sealing device 34 in an upward direction as depicted in FIG. 3, the wedge portion 46b of the lower nonmetal seal 36b will be further compressed between the ring 40 and the arm 42b of the lower metal seal 32b. This compression of the lower wedge portion 46b will result in a further radial biasing force being applied to the arm, thereby further biasing the lower seal surface 44b into contact with the outer surface of the closure member 26.

When a pressure differential 52 is applied across the sealing device 34 in an downward direction as depicted in FIG. 3, the wedge portion 46a of the upper nonmetal seal 36a will be further compressed between the ring 40 and the arm 42a of the upper metal seal 32a. This compression of the upper wedge portion 46a will result in a further radial biasing force being applied to the arm, thereby further biasing the upper seal surface 44a into contact with the outer surface of the closure member 26.

Thus, it will be appreciated that each of the sealing surfaces 44a, 44b is radially biased into metal to metal sealing contact with the outer surface of the closure member 26 due to: 1) elastic deformation of the respective arm 42a, 42b, 2) compression of the respective wedge portion 46a, 46b between the ring 40 and the respective arm due to deformation of the arm, and 3) compression of the respective wedge portion 46a, 46b due to the pressure differential 50 or 52. This results in reliable metal to metal sealing between the metal seals 32a, 32b and the outer surface of the closure member 26.

If, however, the seal surfaces 44a, 44b or the outer surface of the closure member 26 should become damaged, so that metal to metal sealing therebetween cannot be achieved, sealing contact between the nonmetal seals 36a, 36b and the closure member may still be possible.

In another important feature of the sealing device 34, note that, as the closure member 26 displaces upward from its closed position depicted in FIG. 2, sealing contact with the closure member is progressively removed from the lower nonmetal seal 36b, then the lower metal seal 32b, then the upper metal seal 32a, and then the upper nonmetal seal 36a. This means that, if the differential pressure 50 or 52 is applied against the sealing device 34 when the closure member 26 displaces upward, the pressure differential across the lower nonmetal seal 36b will be relieved while the other seals 32a, 32b, 36a maintain sealing contact with the closure member. This prevents damage to the seal 36b from excessive flow when the pressure differential 50 or 52 is relieved.

When the closure member 26 eventually displaces upward sufficiently far that it no longer is in sealing contact with the upper nonmetal seal 36a, and the pressure differential across this seal is thus relieved, the closure member will still be contained within a closely fitted sleeve 66 in which the openings 30 are formed, thereby preventing damage to the seal from excessive flow.

As the closure member 26 displaces downward from its open position in which flow is permitted through the openings 30, the pressure differential 50 or 52 may be applied when the closure member sealingly engages the sealing device 34. The pressure differential 50 or 52 will first be applied to the upper nonmetal seal 36a while the closure member 26 remains within the closely fitted sleeve 66, thereby preventing damage to the seal from excessive flow. Next, in succession, the closure member 26 sealingly contacts the upper metal seal 32a, the lower metal seal 32b, and the lower nonmetal seal 36b.

It may now be fully appreciated that the sealing device 34 provides significant benefits in performing the sealing function in the closure mechanism 24 of the well tool 20. For example, the metal seals 32a, 32b provide for metal to metal sealing between the closure member 26 and the housing assembly 28, the metal seals are resiliently biased into sealing contact in multiple ways (including an increased biasing force as the differential pressure across the sealing device 34 increases), and the nonmetal seals 36a, 36b provide for additional sealing capability in the event that metal to metal sealing cannot be achieved. Pressure differentials from either direction across the sealing device 34 can be sealed against, without damage to the seals 32a, 32b, 36a, 36b, whether the closure member 26 displaces to close or open while the pressure differential exists.

Figure 4:
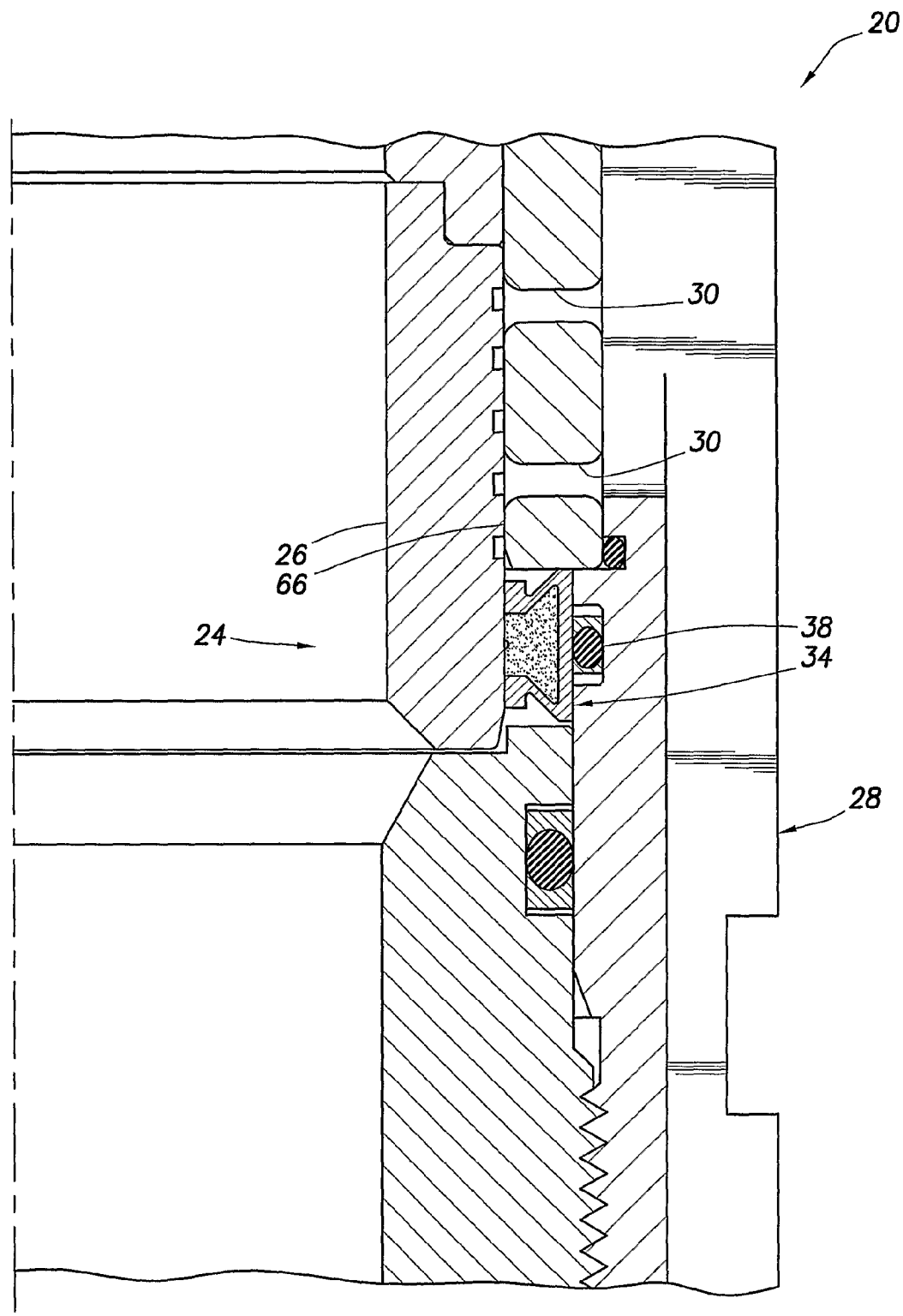
FIG. 4 is an enlarged scale cross-sectional view of an alternate configuration of the closure mechanism.

Referring additionally now to FIG. 4, an alternate configuration of the closure mechanism 24 is representatively illustrated. This alternate configuration of the closure mechanism 24 includes an alternate configuration of the sealing device 34, which is depicted in a further enlarged cross-sectional view in FIG. 5.

The sealing device 34 as illustrated in FIG. 5 is similar in some respects to the sealing device of FIG. 3, in that it includes multiple metal seals 54a, 54b with respective seal surfaces 56a, 56b and inclined beams or arms 58a, 58b extending between the seal surfaces and a ring 60.

The sealing device 34 of FIG. 5 also includes multiple nonmetal seals 62a, 62b positioned between the metal seals 54a, 54b. A wedge portion 64a, 64b of each respective nonmetal seal 62a, 62b is positioned between a respective one of the arms 58a, 58b and the ring 60.

A difference between the nonmetal seals 62a, 62b and the nonmetal seals 36a, 36b described above is that the seals 62a, 62b are formed as a single, integral element, rather than as separate elements. Indeed the nonmetal seals 62a, 62b could be formed as a single seal, if desired. Furthermore, as discussed above for the nonmetal seals 36a, 36b, use of the nonmetal seals 62a, 62b is not required in the sealing device 34 of FIGS. 4 & 5.

As with the configuration of FIGS. 2 & 3, the seal surfaces 56a, 56b of the metal seals 54a, 54b are radially biased into sealing contact with the outer surface of the closure member 26 due to elastic deformation of the arms 58a, 58b and resulting compression of the wedge portions 64a, 64b of the nonmetal seals 62a, 62b between the arms and the ring 60. However, further biasing forces applied to the arms 58a, 58b due to differential pressure across the sealing device 34 occurs somewhat differently in the alternate configuration of FIGS. 4 & 5.

When the closure member 26 is in its closed position as depicted in FIG. 4, the pressure differential 50 will cause the wedge portion 64a of the nonmetal seal 62a to further compress between the arm 58a and the ring 60, thereby applying a biasing force to the arm and further biasing the seal surface 56a against the outer surface of the closure member. When the pressure differential 52 is applied across the sealing device 34, the wedge portion 64b of the nonmetal seal 62b will be further compressed between the arm 58b and the ring 60, thereby applying a biasing force to the arm and further biasing the seal surface 56b against the outer surface of the closure member.

As the closure member 26 displaces upward from its closed position depicted in FIG. 4, sealing contact with the closure member is progressively removed from the lower metal seal 54b, then the lower nonmetal seal 62b, then the upper nonmetal seal 62a, and then the upper metal seal 54a. This means that, if the differential pressure 50 or 52 is applied against the sealing device 34 when the closure member 26 displaces upward, the pressure differential across the nonmetal seals 62a, 62b will be relieved (after the pressure differential is relieved across the lower metal seal 54b) while the upper metal seal 54a maintains sealing contact with the closure member. This prevents damage to the seals 62a, 62b from excessive flow when the pressure differential 50 or 52 is relieved.

When the closure member 26 eventually displaces upward sufficiently far that it no longer is in sealing contact with the upper metal seal 54a, and the pressure differential across this seal is thus relieved, the closure member will still be contained within the closely fitted sleeve 66, thereby preventing damage to the seal from excessive flow.

As the closure member 26 displaces downward from its open position in which flow is permitted through the openings 30, the pressure differential 50 or 52 may be applied when the closure member sealingly engages the sealing device 34. The pressure differential 50 or 52 will first be applied to the upper metal seal 54a while the closure member 26 remains within the closely fitted sleeve 66, thereby preventing damage to the seal from excessive flow. Next, in succession, the closure member 26 sealingly contacts the upper nonmetal seal 62a, the lower nonmetal seal 62b, and the lower metal seal 54b.

It will be appreciated that the sealing device 34 in the configuration of FIGS. 4 & 5 provides similar benefits to those of the configuration of FIGS. 2 & 3. For example, the metal seals 54a, 54b provide for metal to metal sealing between the closure member 26 and the housing assembly 28, the metal seals are resiliently biased into sealing contact in multiple ways (including an increased biasing force as the differential pressure across the sealing device 34 increases), and the nonmetal seals 62a, 62b provide for additional sealing capability in the event that metal to metal sealing cannot be achieved. Pressure differentials from either direction across the sealing device 34 can be sealed against, without damage to the seals 54a, 54b, 62a, 62b, whether the closure member 26 displaces to closed or open positions while the pressure differential exists.

Sealing devices constructed in accordance with the principles of the invention should be capable of sealing against 15,000 psi differential pressure at 325-400° F. in a static condition (no movement of the closure member relative to the housing assembly), and should be capable of reliably sealing against 1500-5000 psi during opening and closing of the closure member.

Of course, a person skilled in the art would, upon a careful consideration of the above description of representative embodiments of the invention, readily appreciate that many modifications, additions, substitutions, deletions, and other changes may be made to the specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A well tool, comprising:
    a housing assembly;
    a tubular closure member which selectively permits and prevents fluid flow through at least one opening in a wall of the housing assembly; and
    a sealing device which seals between the housing assembly and the tubular closure member, the sealing device including at least a first metal seal and at least one nonmetal seal, a sealing surface of the first metal seal contacting a selected one of the housing assembly and the closure member when the tubular closure member prevents flow through the opening, wherein the nonmetal seal radially biases the first metal seal into sealing contact against the selected one of the housing assembly and the tubular closure member in response to a first pressure differential across the sealing device, and wherein the sealing device further includes a second metal seal, and wherein the nonmetal seal radially biases the second metal seal into sealing contact against the selected one of the housing assembly and the tubular closure member in response to a second pressure differential across the sealing device, the first and second pressure differentials being oppositely directed relative to each other.

2. The well tool of claim 1, wherein the first metal seal includes an arm which elastically deforms, thereby biasing the first metal seal against the selected one of the housing assembly and the tubular closure member, when the closure member prevents flow through the opening.

3. The well tool of claim 1, wherein the nonmetal seal is positioned between the first and second metal seals when the sealing device is positioned between the housing assembly and the tubular closure member.

4. A sealing device, comprising:
    a first metal seal; and
    a first nonmetal seal which biases the first metal seal in response to a first pressure differential applied to the sealing device in a first direction, thereby providing a radial seal between a housing assembly and a tubular closure member, wherein fluid flow through at least one opening in a wall of the housing assembly is selectively permitted and prevented in response to longitudinal displacement of the tubular closure member relative to the housing assembly, wherein the first metal seal and a second metal seal are positioned between the first nonmetal seal and a second nonmetal seal when the sealing device is positioned between the housing assembly and the tubular closure member, and wherein the first and second metal seals and the first and second nonmetal seals are positioned on a same longitudinal side of the opening when fluid flow through the opening is prevented by the tubular closure member.

5. The sealing device of claim 4, wherein the second metal seal includes an arm which elastically deforms to bias a sealing surface of the second metal seal against a selected one of the housing assembly and the tubular closure member.

6. The sealing device of claim 4, wherein the second nonmetal seal biases the second metal seal in response to a second pressure differential applied to the sealing device in a second direction opposite to the first direction.

7. The sealing device of claim 4, wherein the first metal seal includes an arm which elastically deforms to bias a sealing surface of the first metal seal against a selected one of the housing assembly and the tubular closure member.

8. A method of sealing between a housing assembly and a tubular closure member, the method comprising:
    providing a sealing device including first and second metal seals and first and second nonmetal seals;
    applying a first pressure differential in a first direction across the sealing device while the sealing device seals between the housing assembly and the tubular closure member, wherein the tubular closure member selectively permits and prevents fluid flow through at least one opening in a wall of the housing assembly; and
    longitudinally displacing the tubular closure member relative to the housing assembly to relieve the first pressure differential, the first metal seal continuing to seal against a selected one of the housing assembly and the tubular closure member until the first nonmetal seal no longer seals against the selected one of the housing assembly and the tubular closure member, wherein the displacing further comprises the first pressure differential being relieved across the first nonmetal seal, then the first metal seal, then the second metal seal, and then the second nonmetal seal.

9. The method of claim 8, wherein the applying further comprises the first nonmetal seal biasing the first metal seal in a radial direction to seal against the selected one of the housing assembly and the tubular closure member.

10. The method of claim 9, further comprising applying a second pressure differential across the sealing device in a second direction opposite to the first direction while the sealing device seals between the housing assembly and the tubular closure member.

11. The method of claim 10, wherein the second pressure differential applying further comprises the second nonmetal seal biasing the second metal seal in the radial direction to seal against the selected one of the housing assembly and the tubular closure member.

12. The method of claim 10, further comprising sealing between the tubular closure member and the housing assembly by elastically deforming an arm of the second metal seal, thereby biasing a sealing surface of the second metal seal against the selected one of the tubular closure member and the housing assembly.

13. The method of claim 12, wherein the second pressure differential applying further comprises the second nonmetal seal applying a force to the arm in response to the second pressure differential, thereby further biasing the sealing surface of the second metal seal against the selected one of the tubular closure member and the housing assembly.

14. The method of claim 8, further comprising sealing between the tubular closure member and the housing assembly by elastically deforming an arm of the first metal seal, thereby biasing a sealing surface of the first metal seal against the selected one of the tubular closure member and the housing assembly.

15. The method of claim 14, wherein the applying further comprises the first nonmetal seal applying a force to the arm in response to the first pressure differential, thereby further biasing the sealing surface of the first metal seal against the selected one of the tubular closure member and the housing assembly.

16. A method of sealing between a housing assembly and a tubular closure member, the method comprising:
    providing a sealing device including first and second metal seals and at least one nonmetal seal, wherein the nonmetal seal biases the first metal seal in a radial direction to seal against a selected one of the housing assembly and the tubular closure member;

applying a first pressure differential in a first direction across the sealing device while the sealing device seals between the housing assembly and the tubular closure member, wherein the tubular closure member selectively permits and prevents fluid flow through at least one opening in a wall of the housing assembly;

longitudinally displacing the tubular closure member relative to the housing assembly to relieve the first pressure differential, the first metal seal continuing to seal against the selected one of the housing assembly and the tubular closure member until the nonmetal seal no longer seals against the selected one of the housing assembly and the tubular closure member; and applying a second pressure differential across the sealing device in a second direction opposite to the first direction while the sealing device seals between the housing assembly and the tubular closure member, wherein the nonmetal seal biases the second metal seal in the radial direction to seal against the selected one of the housing assembly and the tubular closure member.

17. The method of claim 16, wherein the displacing further comprises the first pressure differential being relieved across the first metal seal, then the nonmetal seal, and then the second metal seal.

18. The method of claim 16, further comprising sealing between the tubular closure member and the housing assembly by elastically deforming an arm of the first metal seal, thereby biasing a sealing surface of the first metal seal against the selected one of the tubular closure member and the housing assembly.

19. The method of claim 18, wherein the first pressure differential applying further comprises the nonmetal seal applying a force to the arm in response to the first pressure differential, thereby further biasing the sealing surface of the first metal seal against the selected one of the tubular closure member and the housing assembly.

20. The method of claim 16, further comprising sealing between the tubular closure member and the housing assembly by elastically deforming an arm of the second metal seal, thereby biasing a sealing surface of the second metal seal against the selected one of the tubular closure member and the housing assembly.

21. The method of claim 20, wherein the second pressure differential applying further comprises the nonmetal seal applying a force to the arm in response to the second pressure differential, thereby further biasing the sealing surface of the second metal seal against the selected one of the tubular closure member and the housing assembly.

* * * * *